United States Patent
Giammaria et al.

(10) Patent No.: US 10,009,216 B2
(45) Date of Patent: Jun. 26, 2018

(54) REPEAT EXECUTION OF ROOT CAUSE ANALYSIS LOGIC THROUGH RUN-TIME DISCOVERED TOPOLOGY PATTERN MAPS

(71) Applicant: International Business Machines Corporation, Armonk, NY (US)

(72) Inventors: Alberto Giammaria, Austin, TX (US); Shantanu Godbole, Bangalore (IN); Karthikeyan Ponnalagu, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/939,318

(22) Filed: Nov. 12, 2015

(65) Prior Publication Data
US 2017/0141945 A1 May 18, 2017

(51) Int. Cl.
*G06F 15/173* (2006.01)
*H04L 12/24* (2006.01)

(52) U.S. Cl.
CPC ............ *H04L 41/065* (2013.01); *H04L 41/12* (2013.01); *H04L 41/22* (2013.01)

(58) Field of Classification Search
CPC ....... H04L 41/065; H04L 41/12; H04L 41/22; H04L 45/02; H04L 43/0876
USPC .................................. 709/223, 203; 370/252
See application file for complete search history.

(56) References Cited

U.S. PATENT DOCUMENTS

| | | | |
|---|---|---|---|
| 7,043,661 B2 | 5/2006 | Valadarsky et al. | |
| 7,805,455 B2 | 9/2010 | Todhunter | |
| 8,255,513 B2 * | 8/2012 | Assa | G06F 17/30289 709/223 |
| 8,489,530 B2 | 7/2013 | De et al. | |
| 9,015,194 B2 | 4/2015 | Ziv et al. | |
| 9,262,253 B2 * | 2/2016 | Jain | G06F 11/0736 |
| 2009/0327195 A1 * | 12/2009 | Iscen | G06N 5/042 706/47 |
| 2010/0332645 A1 * | 12/2010 | Duggan | G06F 9/5011 709/224 |
| 2012/0102362 A1 * | 4/2012 | Onitsuka | G06F 11/079 714/37 |

(Continued)

*Primary Examiner* — Frantz Jean
(74) *Attorney, Agent, or Firm* — Ryan, Mason & Lewis, LLP

(57) ABSTRACT

Methods, systems, and computer program products for repeat execution of RCA logic through run-time discovered topology pattern maps are provided herein. A computer-implemented method includes determining one or more topology paths of configuration items from a collection of multiple views of a target system; identifying one or more patterns from the one or more topology paths of configuration items; comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; and generating a user-accessible link via a uniform resource locator for direct invocation of the one or more identified multiple root cause analysis logical expressions executed on the one or more topology paths of configuration items.

20 Claims, 4 Drawing Sheets

(56) References Cited

U.S. PATENT DOCUMENTS

| | | | |
|---|---|---|---|
| 2014/0222745 A1* | 8/2014 | Deng | G06N 7/005 706/47 |
| 2014/0321311 A1* | 10/2014 | Groenendijk | H04L 41/5035 370/252 |
| 2015/0081880 A1* | 3/2015 | Eaton | H04L 47/785 709/224 |
| 2015/0081882 A1* | 3/2015 | Bartucca | H04L 47/785 709/224 |

* cited by examiner

REPEAT EXECUTION OF ROOT CAUSE ANALYSIS LOGIC THROUGH RUN-TIME DISCOVERED TOPOLOGY PATTERN MAPS

FIELD

The present application generally relates to information technology (IT), and, more particularly, to root cause analysis techniques.

BACKGROUND

Root cause analysis (RCA) includes identifying one or more problematic objects or faults for the purpose of problem-solving. Existing RCA approaches, however, present challenges due, for example, to redundant probing and problem recreation by multiple problem-solving individuals/teams, and inefficient transfer and/or sharing of information across multiple problem-solving individuals/teams.

SUMMARY

In one embodiment of the present invention, techniques for repeat execution of RCA logic through run-time discovered topology pattern maps are provided. An exemplary computer-implemented method can include steps of determining one or more topology paths of configuration items from a collection of multiple views of a target system, wherein the target system is identified in a root cause analysis query; identifying one or more patterns from the one or more topology paths of configuration items; comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; and generating a user-accessible link via a uniform resource locator for direct invocation of the one or more identified multiple root cause analysis logical expressions executed on the one or more topology paths of configuration items.

In another embodiment of the invention, an exemplary computer-implemented method can further include steps of executing the one or more of the multiple root cause analysis logical expressions on the one or more topology paths of configuration items via uniform resource locator invocation; and outputting results from the executing step to a user for user verification.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
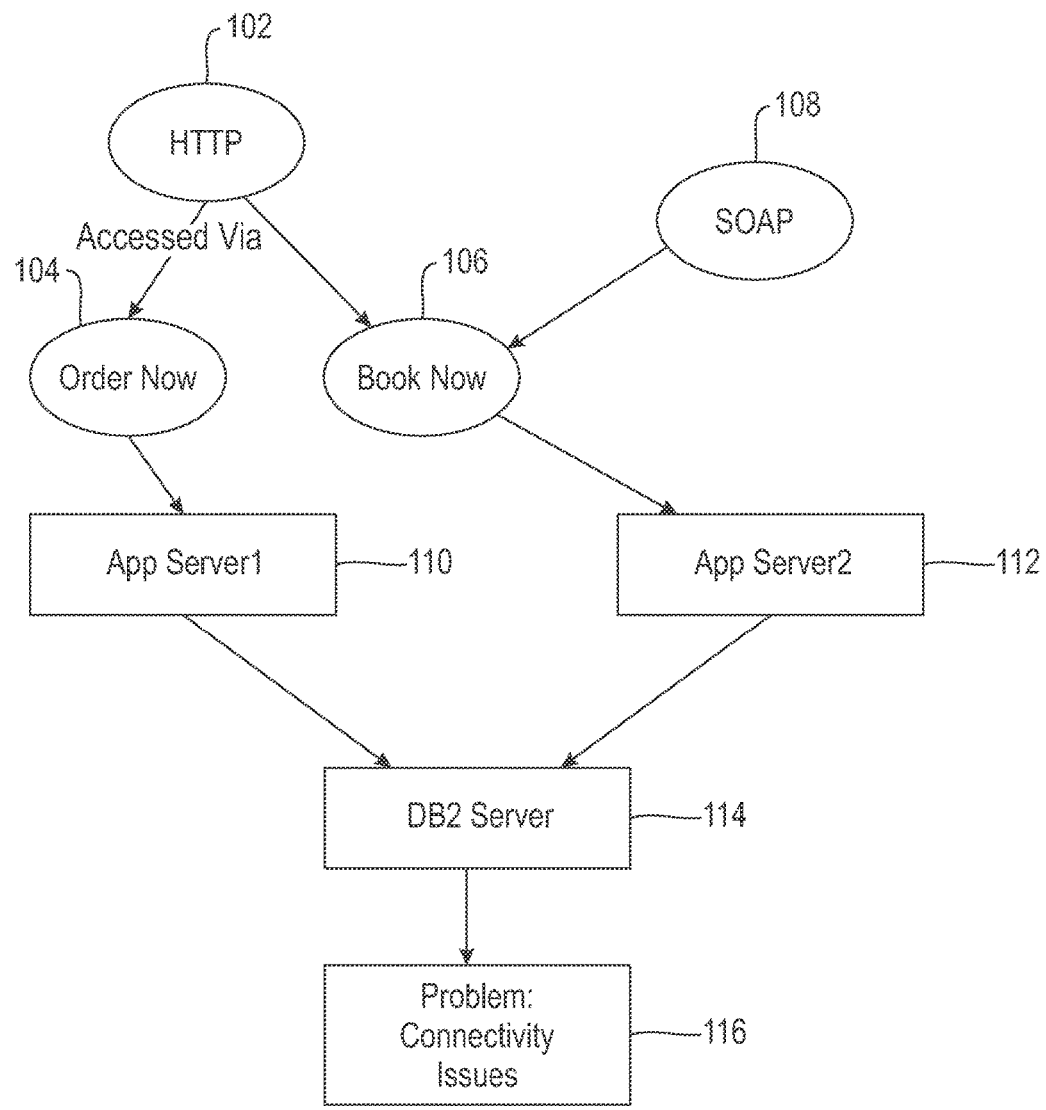
FIG. 1 is a diagram illustrating an exemplary embodiment of the invention.

As described herein, an embodiment of the present invention includes repeating execution of RCA logic through run-time discovered topology pattern maps. One or more embodiments of the invention can include applying diagnostic unit tests on one or more objects associated with root cause candidates, as well as clustering problematic objects and relations into groups. For a required object (identified as a configuration item (CI) from a user response), the CI topology and the discovered patterns from the CI topology can play a role in achieving such clustering. Consider that, in a typical system, there can be more than 150 relationships (dictating different patterns) that can exist between two CI nodes in a topology. The ontology can provide the scope to restrict and/or filter the patterns that are to be supported from an end user perspective. The groups can then be organized accordingly.

Also, at least one embodiment of the invention includes configuration item (CI) topology formulation and/or discovery, which can include identifying components of an application and relationships associated therewith such as dependencies, interactions, federations, etc. Given a natural language query, such an embodiment can include identifying the CIs based on a "problem faced" by the application. The CIs can have one or more relations (Dependency, Association, Containment, etc.) to the application. Additionally, one or more embodiments of the invention include determining a problem fault sequencing based on the associated CI topology. The relationships that are determined in connection with the CI topology formulation and/or discovery, as detailed herein, can be leveraged to further an instance of RCA. Moreover, topology-based RCA, in accordance with at least one embodiment of the invention, enables systematic iterative diagnosis and probing through identified topological paths to identify one or more root causes to a problem.

Also, in conjunction with one or more embodiments of the invention, IT service management (ITSM) functionality can include the use of a configuration management database (CMDB) that enables the IT support organization to understand a given production environment, and also prioritize and resolve (or escalate) issues and problems.

At least one embodiment of the invention includes obtaining and/or receiving a free-form text query (from an end-user, for example) and producing a uniform resource locator (URL) for repeated verification of the status of one or more CIs. A free form text statement queries why a particular problem is faced in some application. Such a statement seeks details of the perceived problem, the root cause of the problem, and specific debugging procedures to confirm if the problem should reappear in the future. Such an embodiment of the invention can also include capturing the steps completed by each support team and/or individual, focusing on a specific layer in the topology, and discovering new and/or additional problems of CIs that share the same topology as the CI specified in the user query. The topology can include a multi-layered stack of different applications, with each layer performing a common functionality (such as data provisioning, data access, business logic containment and execution, user interface (UI) presentation to the user, etc.).

Accordingly, given a natural language query, one or more embodiments of the invention include identifying the CI as well as the "problem faced" (if already identified) by the CI. For each "problem faced," there is an ontology on what data (distributed across systems and entities) should be collected. For the identified CI, one or more embodiments of the invention include obtaining the topology data from the application repository (which stores all topology data), identifying one or more patterns (Containment, Accessed, Federation, etc.), and using such information to iteratively collect data required for each CI in the topology. Any existing problems in the CI can be highlighted, and/or or problems can be discovered from collected data based on the associated debugging units (an atomic procedure focusing on a specific set of system tests) for each CI using the context of topology and patterns. Additionally, at least one embodiment of the invention can also include creating a workflow for each pattern by composing selected debugging units based on the pattern structure, and returning and/or outputting the work flow to an end user as one or more RCA URLs (one per pattern).

Additionally, one or more embodiments of the invention include implementing and utilizing a topology-centric system to verify, report and/or debug CIs that a user can access but are remotely hosted. Such an embodiment can include automatically providing to a user an accessible URL that is dynamically generated and updated in a distributed fashion by hiding the complexity of the underlying topology. Accessing the provided URL relieves the user, for example, of troubleshooting for any possible subsequent malfunctioning of the given hosted CI.

As also described herein, at least one embodiment of the invention includes determining and/or selecting appropriate CI topology patterns to generate RCA URLs for CIs that are similar in context to a reported problem context (before an end-user has raised such a query). Further, such an embodiment can include readying a list of debugging procedures (based on the discovered patterns from the underlying topology) for verifying and confirming the operation status of dependent CIs that are affected with the current problem (that is, the problem pertaining to a given user query). Also, such an embodiment can also include notifying the user and/or support team of a possible performance outbreak. A performance outbreak can be predicted or detected when the application is seen touching the threshold of its maximum functional levels in terms of disk space, memory, scale of user requests, etc. An example of a performance outbreak includes a database application that has already reached 99% of its hard disc capacity based on the accumulated transactions to that point.

FIG. 1 is a diagram illustrating an exemplary embodiment of the invention. By way of illustration, FIG. 1 depicts an example framework that includes a hypertext transfer protocol (HTTP) component 102 which can be accessed via an "Order Now" component 104 and/or a "Book Now" component 106. The HTTP component 102 enables an end user to access the application through a web browser and routes the HTTP request to specific underlying application components. Additionally, a simple object access protocol (SOAP) component 108 interacts with the "Book Now" component 106. The SOAP component 108 enables an alternate way of connecting to an application directly from another application through a format of exchanging business objects. As also depicted in FIG. 1, the "Order Now" component 104 is communicatively linked to a first application server 110, which is communicatively linked to a database server (DB2 server) 114. Additionally, the "Book Now" component 106 is communicatively linked to a second application server 112, which is communicatively linked to database server 114.

In the example embodiment of the invention illustrated in FIG. 1, an agent and/or user has submitted a query seeking a reason why the "Order Now" component 104 is not functioning properly. Accordingly, an example embodiment of the invention can include identifying a problem 116 pertaining to connectivity issues found in a container node of the "Order Now" component 104. By way of illustration, consider the following container pattern:

1. OrderNow—[Debug Procedure—LOGIN]—OK
2. OrderNow—[Debug Procedure—EMAIL]—OK
3. OrderNow—[Debug Procedure—Catalog Query]—FAILED
4. OrderNow—[Debug Procedure—Order Query]—FAILED
5. App. Server [Debug Procedure—New App Instance]—OK
6. App. Server [Debug Procedure—New DB connection]—FAILED
7. DB2 Server [Debug Procedure—Base Schema Query]—OK
8. DB2 Server [Debug Procedure—Base Data Query]—Failed Additionally, consider the following "accessed via" pattern:

1. OrderNow—[Debug Procedure—Access Home Page]—OK
2. HTTP Server—[Debug Procedure—Start/Stop Server]—OK Accordingly, these two example debugging patterns are associated with the Order Now component 104, and each pattern is associated with a list of debugging procedures. On running both lists, an example embodiment of the invention can include detecting the problem and also specifically in which node the problem resides.

Consequently, such an example embodiment of the invention can include identifying and/or analyzing a specified URL (also referred to herein as a "handle") directly hereafter for running diagnostic tests for the "Order Now" component 104. Also, it can be expected that users will query the "Book Now" component 106, and the example embodiment of the invention can include generating another (distinct) URL for the "Book Now" component 106.

Figure 2:
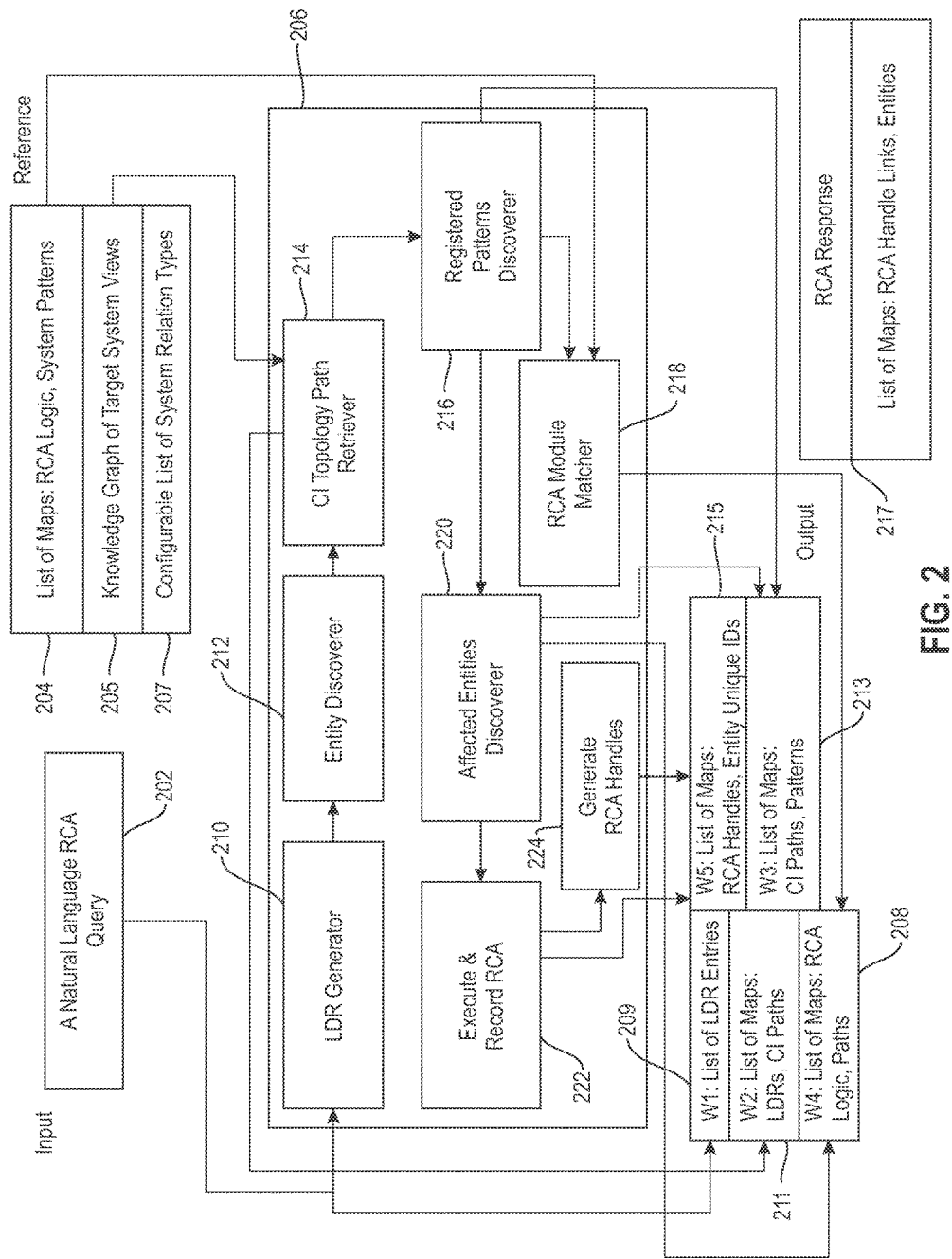
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts an input 202 in the form of a natural language (NL) RCA query, and a collection of input reference elements which can include a list of maps between RCA logic and system architecture patterns 204, a knowledge graph (or list) of target system views captured in a centralized ontology 205, and/or a configurable list of system relation types (such as containment, access, etc.) 207. FIG. 2 also depicts an RCA system 206 and an output which can include a list of LDR entries (W1) 209, a list of maps between LDRs and CI paths (W2) 211, a list of maps between CI paths and patterns (W3) 213, a list of maps between RCA logic and CI paths (W4) 208, and a list of maps between RCA handles and unique entity identifiers (IDs) (W5) 215. Additionally, as further detailed herein, FIG. 2 illustrates an RCA response 217 which includes a list of maps including RCA handling links, entities, etc. The RCA response 217 is the output generated by the system 206 that can be communicated to the end user who raised a free form text query.

The RCA system 206, as depicted in FIG. 2, includes a logical data representation (LDR) generator component 210, which converts the user query into a generic and/or common set of phrases and provides the same to an entity discoverer component 212, which provides input to a CI topology path retriever component 214. Additionally, the CI topology path retriever component 214 provides input to a registered patterns discoverer component 216, which provides input to both an affected entities discoverer component 220 and an RCA module matcher component 218 (which assists in producing the output 208). The affected entities discoverer component 220 provides input to an RCA execution and recordation component 222, which provides input to an RCA handle generation component 224, which assists in producing the output 208.

As noted, in connection with the example embodiment depicted in FIG. 2, during the course of RCA method execution, work data W1-W5 will be generated as the output. As noted above and detailed below, the RCA method (carried out via system 206) can include generating, via the LDR generator component 210, an LDR from the NL query 202, and updating the list of LDR entries (W1) 209. The entity discoverer component 212, as depicted in FIG. 2, uses information from the users (Order Now, etc.) to uniquely identify which entities (along with entities' internal unique identifiers such as IP address, entity identifier (EntityID), etc.) are meant and/or intended by the user.

Also, the example embodiment depicted in FIG. 2 can include, via the CI topology path retriever component 214, using the centralized ontology 205 to discover topology paths and updating the list of maps between LDRs and CI paths (W2) 211. Subsequently, the registered patterns discoverer 216 can identify patterns from the discovered paths and update the list of maps between CI paths and patterns (W3) 213.

Additionally, the RCA module matcher 218 can utilize the list of maps between RCA logic and system patterns 204 to identify and/or retrieve the RCA module that can be associated with each CI path discovered by component 214. The RCA module matcher 218 can also create a map between an RCA logic instance and each discovered CI path and provide the maps to element 208 (W4). Additionally, the configurable list 207 of system relation types, as depicted in FIG. 2, can assist in optimizing the system response. Also, in one or more embodiments of the invention, the affected entities discoverer component 220 can leverage the discovered topology to identify other affected entities, as well as updating the list of maps between CI paths and patterns (W3) 213 by creating a new entry for each of the affected entities. This step can also be repeated for all of the paths in list 213 (W3), and list 208 (W4) can be updated as well.

Via the RCA execution and recordation component 222, the example embodiment of the invention depicted in FIG. 2 can include running the instantiated RCA module and recording specific steps of debugging and/or probing for future iterations. The RCA module can be added to an instance pool with a URL application programming interface (API) for subsequent direct calls. Also, component 222 can additionally create a map between RCA handles and unique entity IDs of the affected entities and add the same to element 215 (W5).

Accordingly, system 206 can generate and/or return a response 217 including RCA execution for the queried entity along with the entity's RCA handles. For future queried entities, a user can, for example, first check element 215 (W5) to identify activated RCA handles, if available. In one or more embodiments of the invention (such as depicted in FIG. 2), the RCA response output 217 represents a response for immediate consumption by the end-user. Response 217 can additionally include a link to an RCA handle, which represents an accessible link for direct invocation with an activation time-stamp.

As detailed herein, at least one embodiment of the invention can include implementing a system (such as system 206 in FIG. 2) that receives a free form text query and produces a URL that is dynamically generated and updated in a distributed fashion, for repeated verification of the status of one or more CIs, by completely hiding the complexity of the underlying topology. Additionally, such a system can also enable an accurate knowledge transfer in a distributed support environment by eliminating redundant and/or repeated debugging procedures using the notion of a RCA URL that captures the steps completed by each support team (focusing on a specific layer in the topology).

Also, at least one embodiment of the invention can include implementing a system (such as system 206 in FIG. 2) that focuses on executing only relevant (or only a given subset of) debugging procedures based on the discovered patterns from an underlying topology (as compared with a current setup, wherein a Level 1 agent asks an end user to try all standard verification procedures including rebooting, etc.). Further, in at least one embodiment of the invention, such a system can discover new problems of CIs that share the same topology as a queried CI by the end user and prepare corresponding RCA URLs for such CIs even before an end user has raised a query related thereto.

Figure 3:
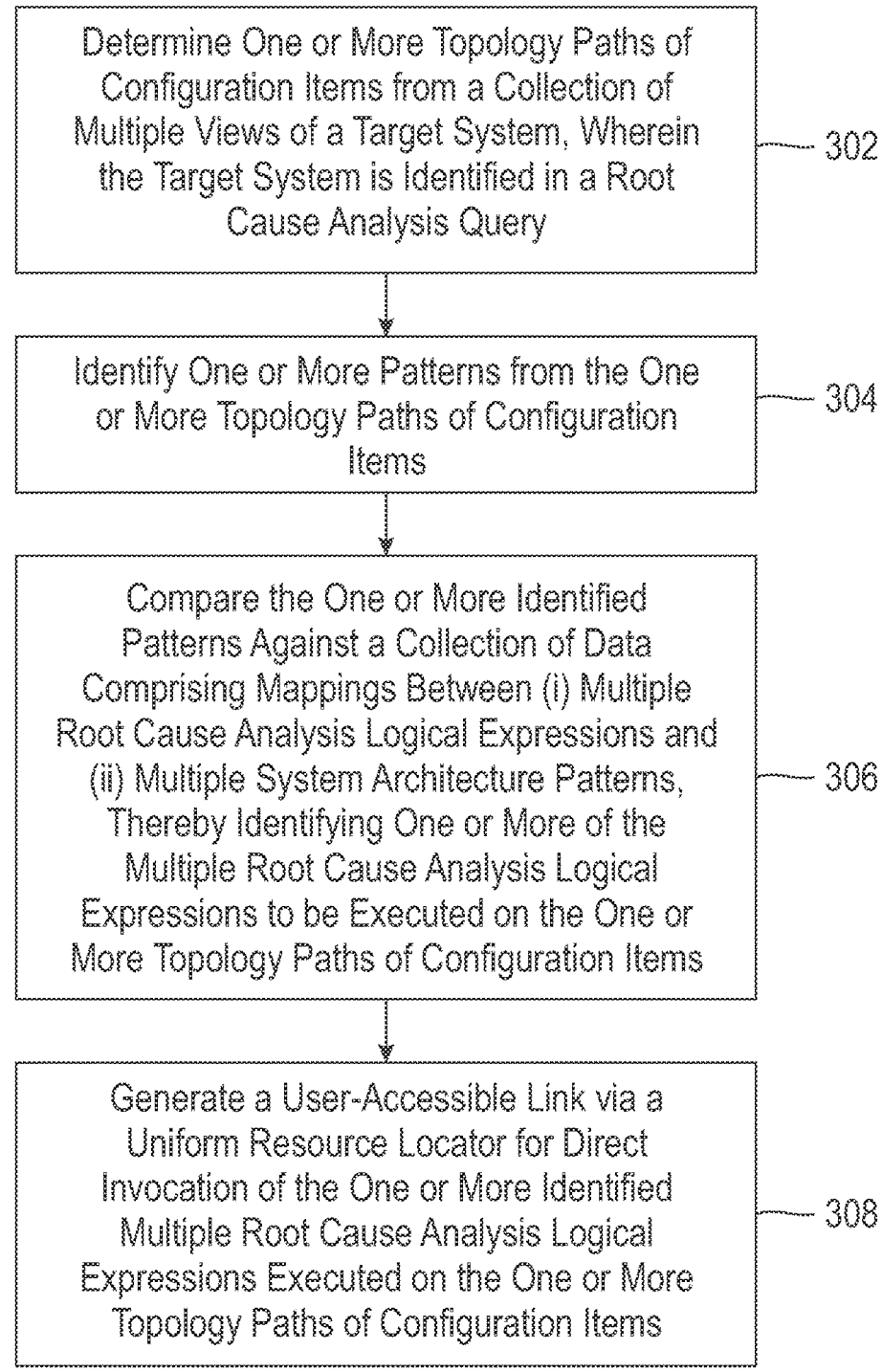
FIG. 3 is a flow diagram illustrating techniques according to an embodiment of the invention.

FIG. 3 is a flow diagram illustrating techniques according to an embodiment of the present invention. Step 302 includes determining one or more topology paths of configuration items from a collection of multiple views of a target system, wherein the target system is identified in a root cause analysis query. The collection of multiple views of a target system can include a knowledge graph. Additionally, the root cause analysis query can include a natural language root cause analysis query.

Step 304 includes identifying one or more patterns from the one or more topology paths of configuration items.

Step 306 includes comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items. Identifying the one or more patterns can further include updating a list of maps between configuration item topology paths and patterns with the one or more identified patterns. Further, identifying the one or more of the multiple root cause analysis logical expressions to be executed on the one or more topology paths of configuration items can further include creating a map between each of the one or more of the multiple root cause analysis logical expressions and the one or more topology paths of configuration items.

Step 308 includes generating a user-accessible link via a uniform resource locator for direct invocation of the one or more identified multiple root cause analysis logical expressions executed on the one or more topology paths of configuration items. The generating step can also include generating the user-accessible link with an activation timestamp.

The techniques depicted in FIG. 3 can additionally include identifying one or more entities in the target system that are affected by the root cause analysis query based on the one or more topology paths of configuration items. Further, at least one embodiment of the invention includes creating a map between (i) one or more root cause analysis uniform resource locators and (ii) the one or more entities in the target system that are affected by the root cause analysis query.

Also, the techniques depicted in FIG. 3 can include executing the one or more of the multiple root cause analysis logical expressions on the one or more topology paths of configuration items, and recording one or more steps of said executing, wherein the one or more steps comprise debugging and/or probing steps. At least one embodiment of the invention can additionally include storing the one or more identified multiple root cause analysis logical expressions in a database with a uniform resource locator application programming interface for one or more subsequent direct calls.

Also, an additional embodiment of the invention can further include executing the one or more of the multiple root cause analysis logical expressions on the one or more topology paths of configuration items via uniform resource locator invocation, and outputting results from the executing step to a user for user verification The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Additionally, an embodiment of the present invention can make use of software running on a computer or workstation.

Figure 4:
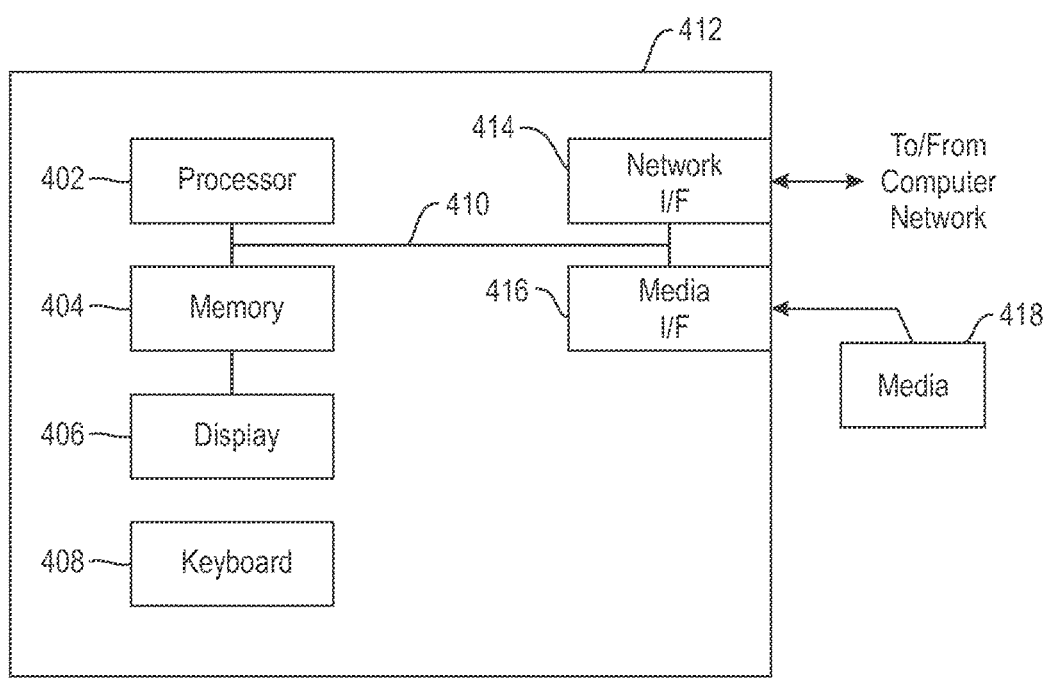
FIG. 4 is a system diagram of an exemplary computer system on which at least one embodiment of the invention can be implemented.

With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, discovering new and/or additional problems of configuration items that share the same topology as a queried configuration item specified by an end-user The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
   determining one or more topology paths of configuration items from a collection of multiple views of a target system, wherein the target system is identified in a root cause analysis query; identifying one or more patterns from the one or more topology paths of configuration items; comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; and generating a user-accessible link via a uniform resource locator for direct invocation of the one or more identified multiple root cause analysis logical expressions executed on the one or more topology paths of configuration items, wherein said generating comprises generating the user-accessible link in a distributed fashion by hiding one or more aspects of an underlying topology, and wherein the user-accessible link enables a user to reduce troubleshooting for a subsequent malfunctioning of the configuration items; wherein said steps are carried out by at least one computing device.

2. The computer-implemented method of claim 1, wherein said collection of multiple views of a target system comprises a knowledge graph.

3. The computer-implemented method of claim 1, wherein said generating comprises generating the user-accessible link with an activation time-stamp.

4. The computer-implemented method of claim 1, comprising:
   identifying one or more entities in the target system that are affected by the root cause analysis query based on the one or more topology paths of configuration items.

5. The computer-implemented method of claim 4, comprising:
   creating a map between (i) one or more root cause analysis uniform resource locators and (ii) the one or more entities in the target system that are affected by the root cause analysis query.

6. The computer-implemented method of claim 1, wherein the root cause analysis query comprises a natural language root cause analysis query.

7. The computer-implemented method of claim 1, comprising:
   executing the one or more of the multiple root cause analysis logical expressions on the one or more topology paths of configuration items.

8. The computer-implemented method of claim 7, comprising:
   recording one or more steps of said executing, wherein the one or more steps comprise debugging and/or probing steps.

9. The computer-implemented method of claim 1, comprising:
   storing the one or more identified multiple root cause analysis logical expressions in a database with a uniform resource locator application programming interface for one or more subsequent direct calls.

10. The computer-implemented method of claim 1, wherein said identifying the one or more patterns further comprises:
    updating a list of maps between configuration item topology paths and patterns with the one or more identified patterns.

11. The computer-implemented method of claim 1, wherein said identifying the one or more of the multiple root cause analysis logical expressions to be executed on the one or more topology paths of configuration items further comprises:
    creating a map between each of the one or more of the multiple root cause analysis logical expressions and the one or more topology paths of configuration items.

12. A computer program product, the computer program product comprising a computer readable storage medium having program instructions embodied therewith, the program instructions executable by a computing device to cause the computing device to:
    determine one or more topology paths of configuration items from a collection of multiple views of a target system, wherein the target system is identified in a root cause analysis query; identify one or more patterns from the one or more topology paths of configuration items; compare the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; and generate a user-accessible link via a uniform resource locator for direct invocation of the one or more identified multiple root cause analysis logical expressions executed on the one or more topology paths of configuration items, wherein said generating comprises generating the user-accessible link in a distributed fashion by hiding one or more aspects of an underlying topology, and wherein the user-accessible link enables a user to reduce troubleshooting for a subsequent malfunctioning of the configuration items.

13. The computer program product of claim 12, wherein the program instructions executable by the computing device further cause the computing device to:
identify one or more entities in the target system that are affected by the root cause analysis query based on the one or more topology paths of configuration items.

14. The computer program product of claim 13, wherein the program instructions executable by the computing device further cause the computing device to:
create a map between (i) one or more root cause analysis uniform resource locators and (ii) the one or more entities in the target system that are affected by the root cause analysis query.

15. The computer program product of claim 12, wherein the root cause analysis query comprises a natural language root cause analysis query.

16. The computer program product of claim 12, wherein the program instructions executable by the computing device further cause the computing device to:
execute the one or more of the multiple root cause analysis logical expressions on the one or more topology paths of configuration items.

17. The computer program product of claim 16, wherein the program instructions executable by the computing device further cause the computing device to:
record one or more steps of said executing, wherein the one or more steps comprise debugging and/or probing steps.

18. The computer program product of claim 12, wherein the program instructions executable by a computing device further cause the computing device to:
store the one or more identified multiple root cause analysis logical expressions in a database with a uniform resource locator application programming interface for one or more subsequent direct calls.

19. A system comprising:
a memory; and
at least one processor coupled to the memory and configured for:
determining one or more topology paths of configuration items from a collection of multiple views of a target system, wherein the target system is identified in a root cause analysis query; identifying one or more patterns from the one or more topology paths of configuration items; comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; and
generating a user-accessible link via a uniform resource locator for direct invocation of the one or more identified multiple root cause analysis logical expressions executed on the one or more topology paths of configuration items, wherein said generating comprises generating the user-accessible link in a distributed fashion by hiding one or more aspects of an underlying topology, and wherein the user-accessible link enables a user to reduce troubleshooting for a subsequent malfunctioning of the configuration items.

20. A computer-implemented method, comprising steps of:
determining one or more topology paths of configuration items from a collection of multiple views of a target system;
identifying one or more patterns from the one or more topology paths of configuration items; comparing the one or more identified patterns against a collection of data comprising mappings between (i) multiple root cause analysis logical expressions and (ii) multiple system architecture patterns, thereby identifying one or more of the multiple root cause analysis logical expressions to be executed on the one or more topology paths of configuration items; executing the one or more of the multiple root cause analysis logical expressions on the one or more topology paths of configuration items via uniform resource locator invocation, wherein the uniform resource locator enables a user to reduce troubleshooting for a subsequent malfunctioning of the configuration items; and outputting results from said executing to a user for user verification; wherein said steps are carried out by at least one computing device.

* * * * *